US009197588B2

(12) United States Patent
Chen

(10) Patent No.: US 9,197,588 B2
(45) Date of Patent: Nov. 24, 2015

(54) METHOD OF SUPPORTING THIRD-PARTY APPLICATIONS IN AN INSTANT MESSAGING SYSTEM AND A SYSTEM USING THE SAME

(71) Applicant: Tencent Technology (Shenzhen) Company Limited, Shenzhen (CN)

(72) Inventor: Guangyao Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 106 days.

(21) Appl. No.: 14/095,925

(22) Filed: Dec. 3, 2013

(65) Prior Publication Data

US 2014/0095638 A1    Apr. 3, 2014

Related U.S. Application Data

(63) Continuation of application No. PCT/CN2013/076143, filed on May 23, 2013.

(30) Foreign Application Priority Data

Jul. 9, 2012    (CN) .......................... 2012 1 0235065

(51) Int. Cl.
H04L 12/58    (2006.01)
(52) U.S. Cl.
CPC .............. *H04L 51/046* (2013.01); *H04L 51/04* (2013.01)
(58) Field of Classification Search
CPC .............................. H04L 51/04; H04L 51/046
See application file for complete search history.

(56) References Cited

U.S. PATENT DOCUMENTS

| 2003/0093480 A1 | 5/2003 | Lagarde et al. | |
| 2006/0036692 A1* | 2/2006 | Morinigo et al. | 709/206 |
| 2007/0244980 A1* | 10/2007 | Baker et al. | 709/207 |
| 2009/0177695 A1 | 7/2009 | Mahajan et al. | |

FOREIGN PATENT DOCUMENTS

| CN | 101094199 A | 12/2007 |
| CN | 101552737 A | 10/2009 |

OTHER PUBLICATIONS

Gross et al. ( PRIMI—An Open Platform for the Rapid and Easy Development of Instant Messaging Infrastructures, 8 pages, IEEE, 2005).*

(Continued)

*Primary Examiner* — Kevin Bates
*Assistant Examiner* — Jeyanath Jeyaratnam
(74) *Attorney, Agent, or Firm* — Morgan, Lewis & Bockius LLP

(57) ABSTRACT

A mobile terminal system for providing instant messaging to a third-party application includes a mobile terminal having one or more processors and memory for storing one or more programs, wherein the one or more programs, when executed by the one or more processors, cause the mobile terminal to perform the instructions of acquiring an application ID (appid) and a software development kit (SDK) from an instant messaging open platform by the third-party application; registering the third-party application at the instant messaging open platform using the acquired appid and SDK when the third-party application initiates; providing an open application programming interface (API) to the third-party application via the instant messaging open platform; and transmitting information between the instant messaging open platform and the third-party application via the open API.

20 Claims, 13 Drawing Sheets

(56) References Cited

OTHER PUBLICATIONS

Tencent Technology, ISRWO, PCT/CN2013/076143, Aug. 29, 2013, 11 pgs.

Tencent Technology, OA, KR2015-7002640, Mar. 20, 2015, 2 pgs.

Tencent Technology, IPRP, PCT/CN2013/076143, Jan. 13, 2015, 6 pgs.

* cited by examiner

METHOD OF SUPPORTING THIRD-PARTY APPLICATIONS IN AN INSTANT MESSAGING SYSTEM AND A SYSTEM USING THE SAME

RELATED APPLICATIONS

This application is a continuation application of PCT Patent Application No. PCT/CN2013/076143, entitled "A METHOD OF SUPPORTING THIRD-PARTY APPLICATIONS IN AN INSTANT MESSAGING SYSTEM AND A SYSTEM USING THE SAME" filed on May 23, 2013, which claims priority to Chinese Patent Application No. 201210235065.5, entitled "A METHOD OF SUPPORTING THIRD-PARTY APPLICATIONS IN AN INSTANT MESSAGING SYSTEM AND A SYSTEM USING THE SAME," filed Jul. 9, 2012, both of which are incorporated by reference in their entirety.

TECHNICAL FIELD

The disclosed implementations relate generally to the field of instant messaging technology, and in particular, to methods and systems of instant messaging for a third-party application.

BACKGROUND

With the development of the internet technology, various instant messaging (IM) technologies constantly emerge. WeChat is a faster instant messaging tool with functions such as zero expense, cross-platform communication, and real-time input display. Comparing with the conventional text messaging, WeChat is more flexible, intelligent and cost-saving. Accordingly, WeChat is increasingly pursued and favored by users.

However, existing instant communication tools including microblog cannot provide mutual starting and information transmission to a third-party program. For example, in an open platform of some existing Social Networking Services (SNS) mobile messaging software (e.g., the microblog etc.), when communication with a third-party program is implemented, only the third-party program sends information to a Web-based end through an open Application Programming Interface (API), but the mobile terminals cannot mutually start the programs and exchange information. Therefore, the diversity of media contents that can be transmitted between the instant messaging mobile terminals and the user experience are greatly limited.

SUMMARY

The present invention provides an instant messaging method and system oriented to third-party applications so as to implement an effective interaction between an instant messaging tool and a third-party application, and to improve the diversity of media contents that can be transmitted between the instant messaging mobile terminals.

To achieve the above objective, the present invention provides an instant messaging method oriented to third-party applications, which includes the steps of registering, when a third-party application is started, the third-party application on an instant messaging open platform through an appid and a Software Development Kit (SDK) component obtained through preliminary application; and providing, by the instant messaging open platform, an open API interface for the registered third-party application, and performing information transmission with the third-party application through the open API interface.

In some implementations, the step of registering, when the third-party application is started, the third-party application on the instant messaging open platform through the appid and the SDK component obtained through preliminary application includes starting the SDK component obtained through preliminary application when the third-party application is started; and registering, through the SDK component, the appid of the third-party application obtained through preliminary application and a logo icon in a preset memory area of the instant messaging open platform.

In some implementations, the step of performing, by the instant messaging open platform, information transmission with the third-party application through the open API interface includes when the third-party application may need to perform information communication with the instant messaging open platform, caching, by the third-party application, information content to be sent in a preset memory area of the instant messaging open platform, and starting the instant messaging open platform through the SDK component; and reading, by the instant messaging open platform, the content in the preset memory area, determining whether a new third-party application exists, and if yes, saving the appid and the logo icon of the third-party application; and further determining whether information content to be displayed of the corresponding third-party application exists in the preset memory area, and if yes, transmitting the content to be displayed to a user group associated with a local terminal.

In some implementations, the step of performing, by the instant messaging open platform, information transmission with the third-party application through the open API interface includes sending, by the instant messaging open platform, a request to the third-party application to obtain response information; caching, by the third-party application, content of the response information in a preset memory area of the instant messaging open platform according to the request; and obtaining, by the instant messaging open platform, the content of the response information from the preset memory area through checking the preset memory area, and transmitting the content of the response information to the user group associated with the local terminal.

In some implementations, before the step of registering, when the third-party application is started, the third-party application on the instant messaging open platform through the appid and the SDK component obtained through preliminary application, the method further includes applying, by the third-party application, from the instant messaging open platform to obtain the appid and the SDK component.

In some implementations, the present invention provides an instant messaging system, which includes: a third-party application and an instant messaging open platform, where the third-party application is configured to, when being started, register on the instant messaging open platform through an appid and an SDK component obtained through preliminary application; and the instant messaging open platform is configured to provide an open API interface for the registered third-party application, and perform information transmission with the third-party application through the open API interface.

In some implementations, the third-party application is further configured to, when being started, start the SDK component obtained through preliminary application, and register the appid of the third-party application obtained through preliminary application and a logo icon in a preset memory area of the instant messaging open platform through the SDK component.

In some implementations, the third-party application is further configured to, when the third-party application may need to perform information communication with the instant messaging open platform, cache information content to be sent in a preset memory area of the instant messaging open platform, and start the instant messaging open platform through the SDK component; and the instant messaging open platform is further configured to read the content in the preset memory area, determine whether a new third-party application exists, and if yes, save the appid and the logo icon of the third-party application; and further determine whether information content to be displayed of the corresponding third-party application exists in the preset memory area, and if yes, transmit the content to be displayed to a user group associated with a local terminal.

In some implementations, the instant messaging open platform is further configured to send a request to the third-party application to obtain response information; obtain content of the response information from the preset memory area through checking the preset memory area, and transmit the content of the response information to a user group associated with a local terminal; and the third-party application is further configured to cache the content of the response information in a preset memory area of the instant messaging open platform according to the request sent by the third-party application.

In some implementations, the third-party application is further configured to apply from the instant messaging open platform to obtain the appid and the SDK component.

In the instant messaging method and system oriented to third-party applications according to the present invention, the third-party application and the instant messaging open platform may transmit information to each other through the open API interface of the instant messaging open platform (e.g., WeChat). The third-party application may actively or passively provide media contents to the instant messaging open platform, and the instant messaging open platform implemented mobile terminal may display the media contents in a friend dialog box or send the media contents to a circle of friends. Therefore, more third-party applications may be implemented to communicate with the instant messaging open platform so that media contents that can be transmitted between the instant messaging mobile terminals have more sources and diversities, and become more attractive to the user group.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

To make the technical solutions of the present invention more comprehensible, further detailed description is made in the following with reference to the accompanying drawings.

DETAILED DESCRIPTION

Reference will now be made in detail to implementations, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. The implementations of the present invention are described in detail below with reference to the accompanying drawings, but the present invention can be implemented in different manners within the appended claims.

In accordance with the present invention, a third-party application applies from an instant messaging open platform to obtain an application ID (appid) and a Software Development Kit (SDK) component, and when the third-party application is started, the third-party application registers on the instant messaging open platform using the obtained appid and SDK component. The instant messaging open platform provides an open Application Programming Interface (API) to the registered third-party application, and performs information transmission with the third-party application through the open API interface. The third-party application may actively or passively provide media contents to the instant messaging open platform, and the instant messaging open platform implemented on a mobile terminal may display the media contents in a friend dialog box or send the media contents to a circle of friends or other users of the instant messaging open platform (e.g., a person that the user has been following). In some implementations, the user may publish the media contents provided by the third-party application to his/her own blog or share the media contents on the user's account at another social networking service application (e.g., Facebook, Google+, Twitter, etc.) that has bound to the mobile terminal. In some implementations, the user can share the media content. Therefore, more third-party applications may be implemented to communicate with the instant messaging open platform so that media contents that can be transmitted between the instant messaging mobile terminals have more sources and diversities, and become more attractive to the user group.

The instant messaging open platform according to the present invention may refer to a WeChat open platform, however, the present invention is not limited to this implementation, and can be implemented to different open platforms.

Figure 1:
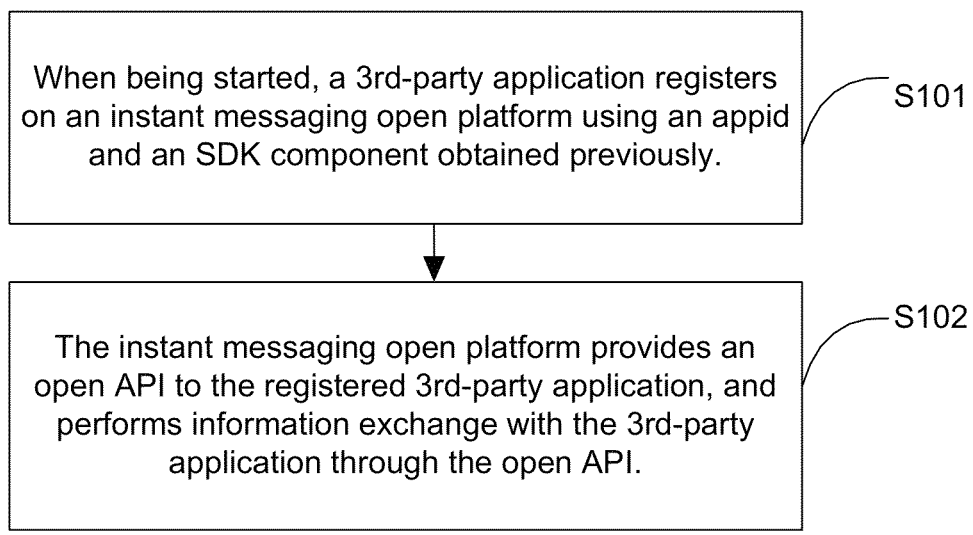
FIG. 1 is a schematic flow chart of Embodiment 1 of an instant messaging method oriented to third-party applications in the present invention.

As shown in FIG. 1, Embodiment 1 of the present invention provides an instant messaging method oriented to third-party applications, which includes the following steps.

Step S101: When a third-party application is started, the third-party application registers on an instant messaging open platform through an appid and an SDK component obtained through preliminary application.

To implement information transmission between the third-party application and the instant messaging open platform, in some implementations, the third-party application may need to access the instant messaging open platform.

The third-party application may need to apply from the instant messaging open platform to obtain the appid of the third-party application, and download the corresponding SDK component. The applying process may be that the third-party application applies from the instant messaging open platform to obtain the appid and the SDK component in advance after the third-party application is developed and programmed, and the applying process may further be that the third-party application temporarily applies from the instant messaging open platform to obtain the appid and the SDK component when the third-party application needs to access and communicate with the instant messaging open platform.

The program of the third-party application is installed on an instant messaging mobile terminal implemented with the instant messaging open platform, e.g., a cell phone.

When a user downloads and installs the program of the third-party application on the instant messaging mobile terminal, the third-party application starts the SDK component obtained through application, and registers, through the SDK component, the appid of the third-party application obtained through application and a logo icon of the third-party application in a preset memory area of the instant messaging open platform. The preset memory area functions as a special clipboard of the instant messaging open platform, and is used for storing the appid and the logo icon of the third-party application, and further for caching information contents to be subsequently sent by the third-party application to the instant messaging open platform.

In some implementations, to facilitate identification, a special identifier may be established for the preset memory area, and the instant messaging open platform obtains contents in the preset memory area through the special identifier.

Step S102: The instant messaging open platform provides an open API interface to the registered third-party application, and performs information transmission with the third-party application through the open API interface.

When the third-party application finishes registration on the instant messaging open platform, the instant messaging open platform provides the open API interface to the registered third-party application, and the instant messaging open platform performs information transmission with the third-party application through the open API interface, and sends transmitted information to a user group associated with the instant messaging terminal. In some implementations when WeChat is implemented, the third-party application and a WeChat user group may communicate and exchange information contents so that media contents that can be transmitted between the instant messaging terminals have more sources and diversities, and become more attractive to the user group.

Figure 2:
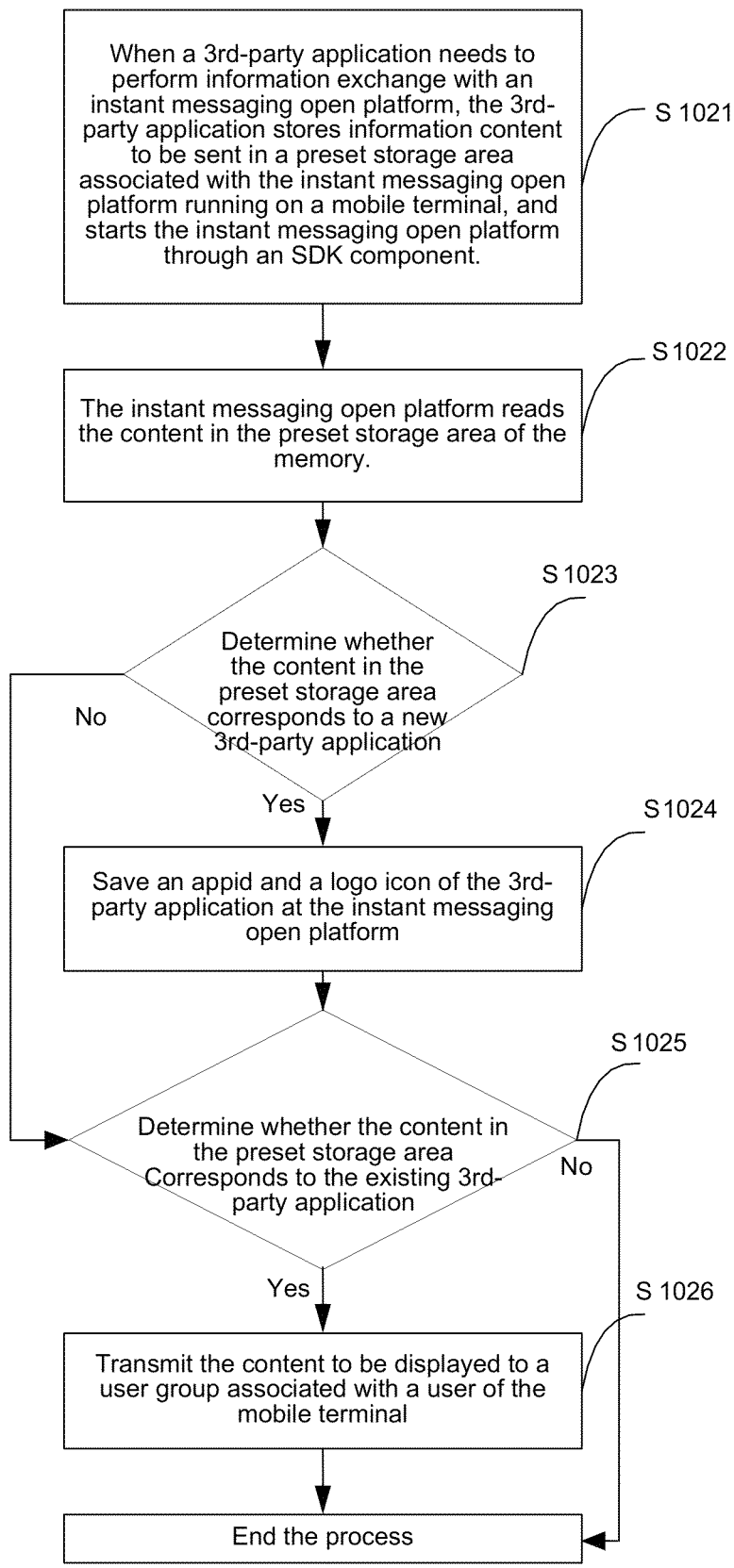
FIG. 2 is a schematic flow chart of an implementation manner in which an instant messaging open platform performs information transmission with a third-party application through an open API interface in Embodiment 1 of an instant messaging method oriented to third-party applications in the present invention.

FIG. 2 illustrates that step S102 of FIG. 1 further includes the following steps:

Step S1021: When the third-party application needs to perform information communication with the instant messaging open platform, the third-party application caches information content to be sent in a preset memory area of the instant messaging open platform, and starts the instant messaging open platform through the SDK component.

Step S1022: The instant messaging open platform reads the content in the preset memory area.

Step S1023: Determine whether a new third-party application exists in the preset memory area, and if yes, proceed to step S1024; otherwise, proceed to step S1025.

Step S1024: Save the appid and the logo icon of the third-party application, and proceed to step S1025.

The instant messaging open platform finds an update of a third-party application through checking the preset memory area, obtains and saves information from the memory area, such as the appid and the logo icon of the newly registered third-party application, provides an availability notification of the newly registered third-party application at an interface of the instant messaging terminal implemented with the instant messaging open platform, and adds the third-party application to an accessory column.

Step S1025: Determine whether information content to be displayed of the corresponding third-party application exists in the preset memory area, and if yes, proceed to step S1026; otherwise, end the process.

Step S1026: Transmit the content to be displayed to a user group associated with the local terminal. In some implementations, the information content transmitted by the third-party application is sent to a WeChat friend or a WeChat circle of friends on the WeChat open platform.

In the implementations set forth above, communication and information exchange between a third-party application and an instant messaging open platform are implemented. By such, more third-party applications may be added to the instant messaging open platform so that media contents that can be transmitted on the instant messaging terminal have more sources and diversities, and become more attractive to the user group, thereby gathering more user groups.

Figure 3:
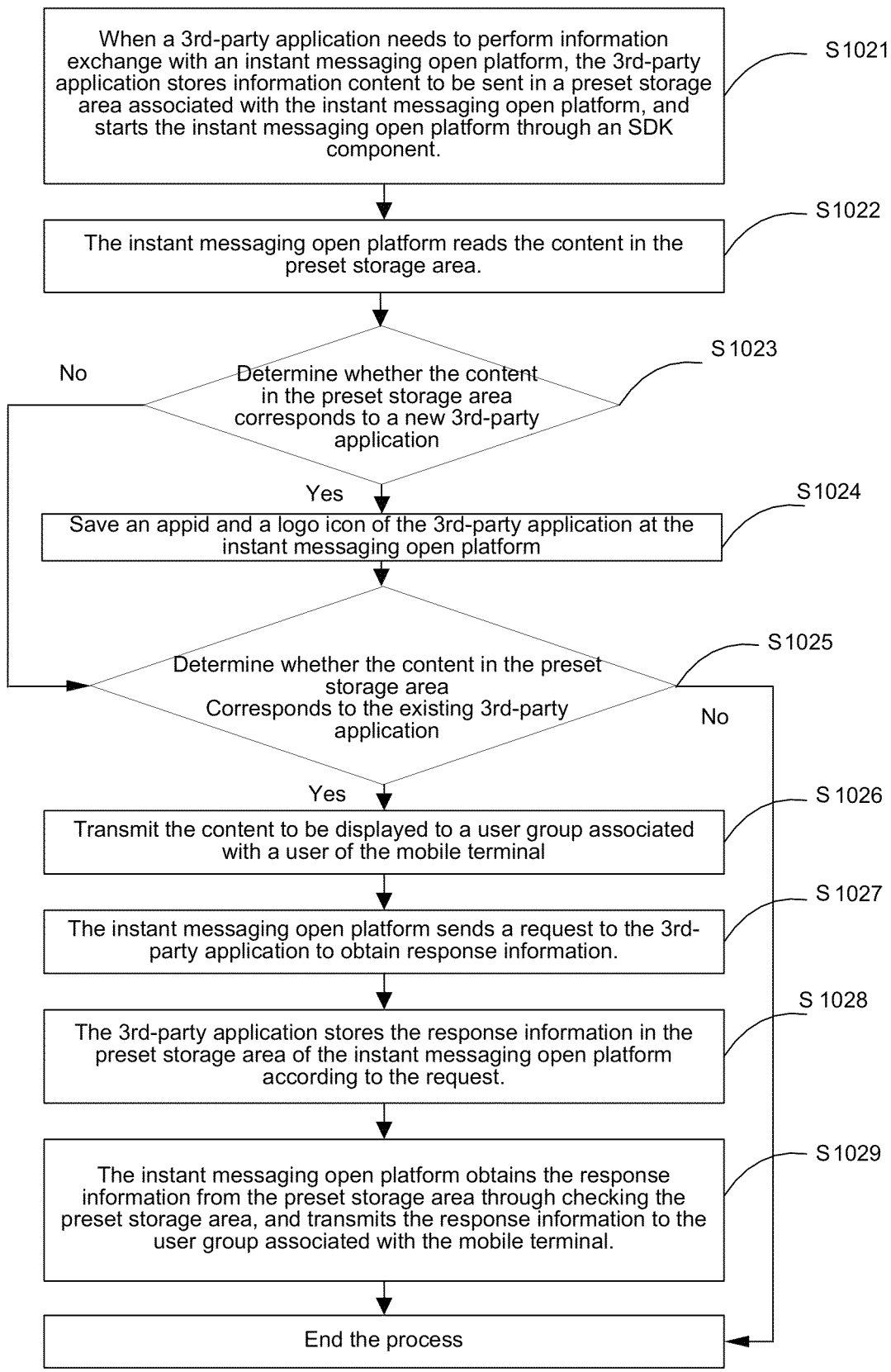
FIG. 3 is a schematic flow chart of another implementation manner in which an instant messaging open platform performs information transmission with a third-party application through an open API interface in Embodiment 1 of an instant messaging method oriented to third-party applications in the present invention.

FIG. 3 illustrates a further implementation manner of step S102 in FIG. 1. The step of performing, by the instant messaging open platform, information transmission with the third-party application through the open API interface may further include the following steps after step S1026.

Step S1027: The instant messaging open platform sends a request to the third-party application to obtain response information.

When the instant messaging open platform requests the third-party application to send information contents, the instant messaging open platform sends a request to the third-party application to start the third-party application program.

Step S1028: The third-party application caches the contents of the response information in a preset memory area of the instant messaging open platform according to the request.

Step S1029: The instant messaging open platform obtains the content of the response information from the preset memory area through checking the preset memory area, and transmits the content of the response information to the user group associated with the local terminal.

In some implementations, the third-party application transmits information to the instant messaging open platform, and the instant messaging open platform may further request, according to a demand, the third-party application to send corresponding information contents.

In the implementations set forth above, more third-party applications may be added to the instant messaging open platform so that media contents that can be transmitted on the instant messaging terminal have more sources and diversities, and become more attractive to the user group, thereby gathering more user groups. Consequently, the application performance and the user experience of the instant messaging terminal are improved.

It should be noted that in the second implementation manner, step S1027, step S1028, and step S1029 may further be implemented independent of the first implementation manner.

Figure 4A:
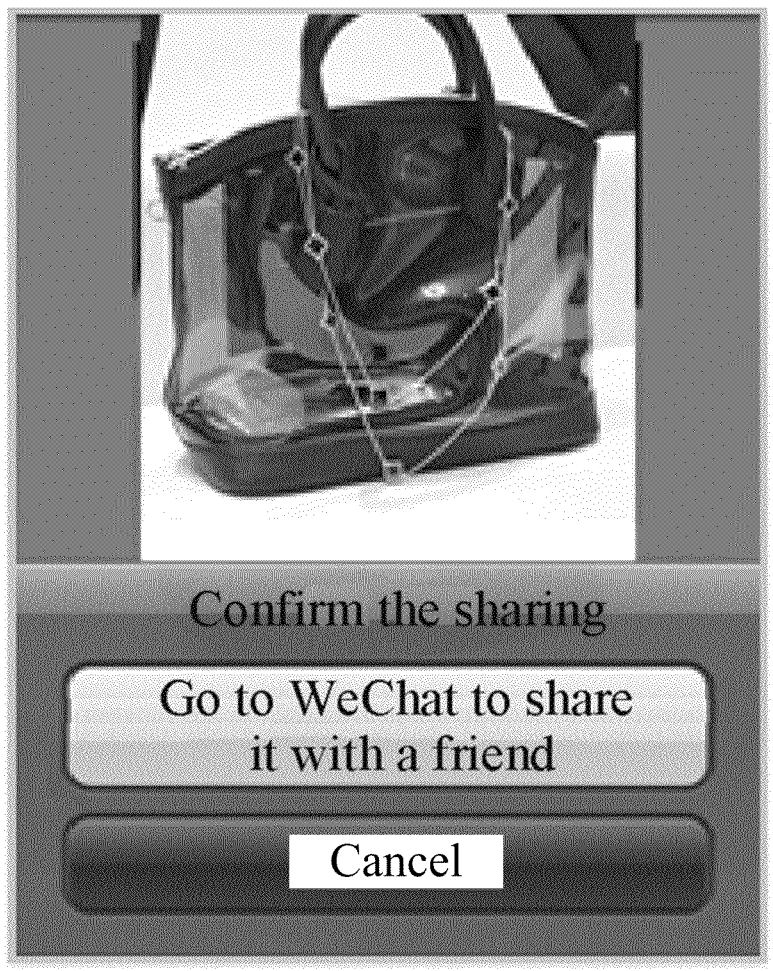
FIG. 4A is a schematic diagram of an interface in which Meilishuo sends content to a WeChat open platform in an example of an instant messaging method oriented to third-party applications in the present invention.
Figure 4B:
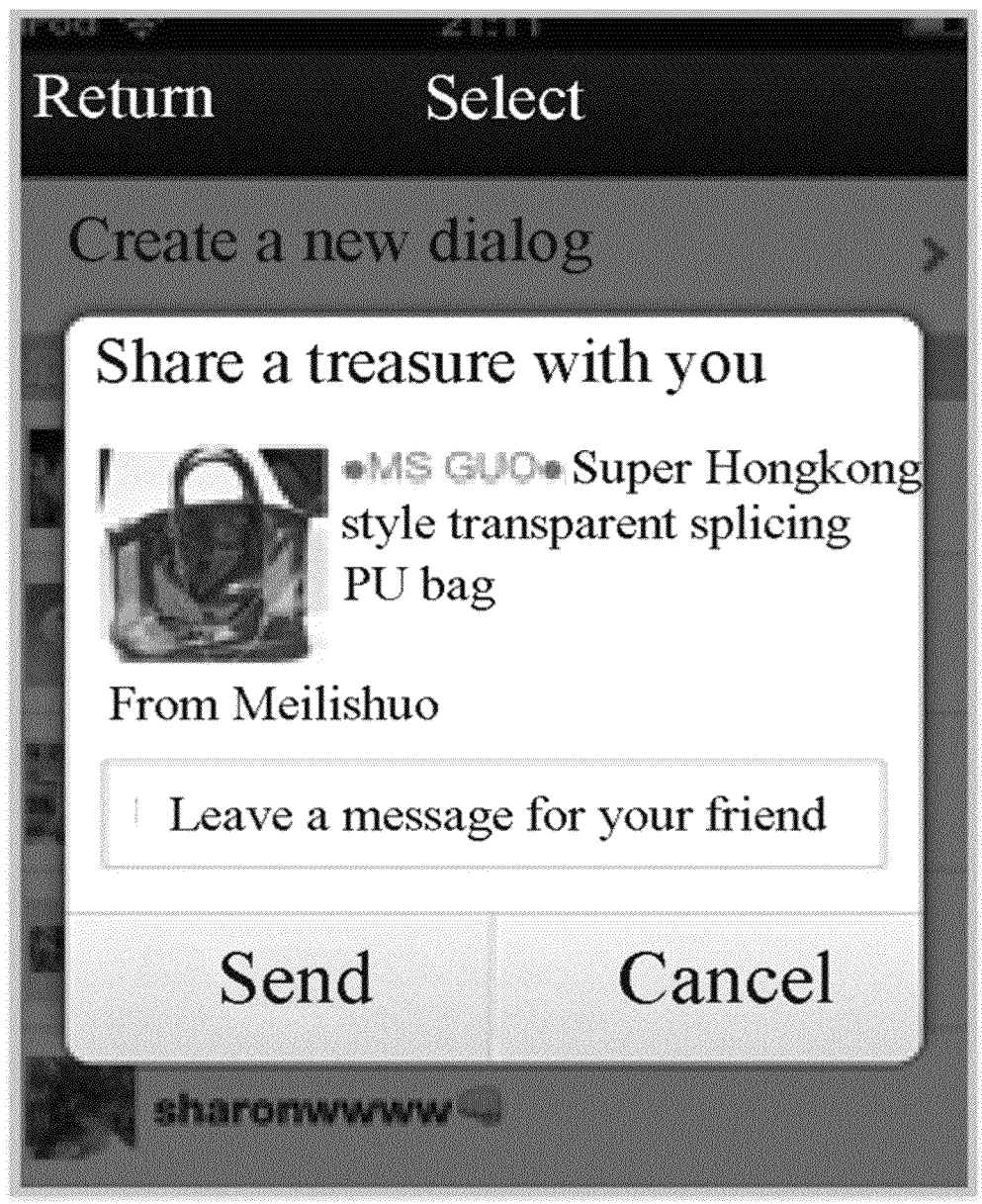
FIG. 4B and FIG. 4C are schematic diagrams showing the processing, by a WeChat open platform, content to be displayed in an example of an instant messaging method oriented to third-party applications in the present invention.
Figure 4C:

FIGS. 4A-4C illustrate an example of communication between a third-party application and an instant messaging open platform. The third-party application is Meilishuo (at www.meilishuo.com), which is a social networking service application that provides users information about fashion design, skincare and allows them to share their own experience with other users. The instant messaging open platform is a WeChat open platform, which is a mobile phone text and voice messaging communication service.

First, the Meilishuo may apply from the WeChat open platform to obtain a development appid, and download a WeChat SDK component used for development. When a user downloads the Meilishuo and starts the Meilishuo for the first time, the WeChat SDK component registers the appid and a logo icon of the Meilishuo in a preset memory area (hereinafter refer to a V clipboard) configured by a system. The V clipboard has a special identifier, and a main program of the WeChat open platform may obtain contents of the clipboard through the identifier.

As shown in FIG. 4A, when the Meilishuo needs to send contents to the WeChat open platform, the Meilishuo first places the contents to be sent in the V clipboard, and simultaneously starts the main program of the WeChat open platform through the WeChat SDK component. After being started, the main program of the WeChat open platform first reads the contents in the V clipboard. If the main program finds a newly registered third-party application in the V clipboard, the main program reads information such as an appid and a logo icon of the newly registered third-party application from the V clipboard, saves the information in a cache file, and simultaneously provides an availability notification of the newly registered third-party application program in a chatting accessory column.

In some implementations as shown in FIGS. 4B and 4C, after reading the content of the V clipboard, if the Meilishuo finds contents transmitted by the third-party application are for display, the WeChat open platform processes the contents to be displayed accordingly, and sends the contents to be displayed to a friend dialog box or a circle of friends.

Further, if the WeChat open platform needs to request the Meilishuo to respond with a message, the WeChat open platform finds the relevant information about the Meilishuo from a locally saved third-party application list, and starts the Meilishuo.

After being started by the WeChat open platform, the Meilishuo sends response contents to the V clipboard, starts the WeChat open platform again, and returns the initiative to the WeChat open platform. After being started by the Meilishuo, the WeChat open platform checks the contents in the V clipboard through the special identifier of the V clipboard, obtains the contents of the response of the Meilishuo from the V clipboard, and sends the contents to a dialog box or the circle of friends.

In this implementation, more third-party applications may be added to the instant messaging open platform so that media contents that can be transmitted between the instant messaging terminals have more sources and diversities, and become more attractive to the user group.

Figure 5:
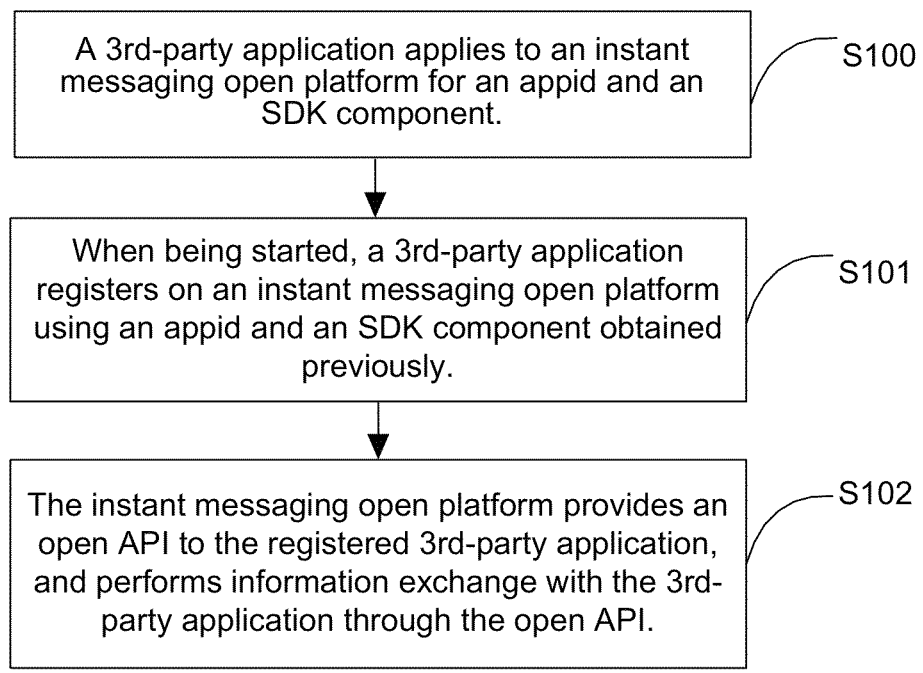
FIG. 5 is a schematic flow chart of Embodiment 2 of an instant messaging method oriented to third-party applications in the present invention.

As shown in FIG. 5, Embodiment 2 of the present invention provides an instant messaging method oriented to third-party applications. Based on Embodiment 1 described above, the method further includes the following step before step S101:

Step S100: The third-party application applies from the instant messaging open platform to obtain the appid and the SDK component.

A difference between Embodiment 2 and Embodiment 1 lies in that in Embodiment 2, when the third-party application needs to access and communicate with the instant messaging open platform, the third-party application temporarily applies from the instant messaging open platform to obtain the appid and the SDK component of the third-party application. The rest of Embodiment 2 is the same as that of Embodiment 1.

Figure 6:
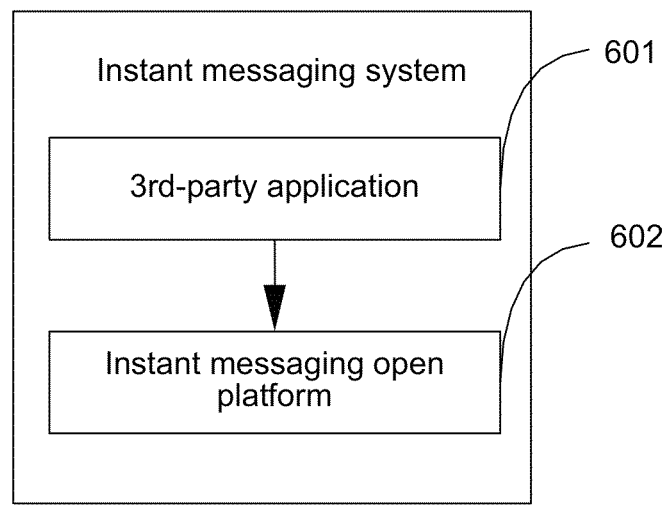
FIG. 6 is a schematic structural diagram of an exemplary implementation of an instant messaging system in the present invention.

The implementations shown in FIG. 6 provides an instant messaging system, which includes a third-party application 601 and an instant messaging open platform 602, where the third-party application 601 and the instant messaging open platform 602 are both implemented in an instant messaging terminal. Note that it is optional for the third-party application 601 and the instant messaging open platform 602 to be implemented on the same hardware. In some other implementations, the two applications may be implemented on different hardware devices as long as a user of the third-party application 601 can communicate information from the third-party application 601 to the instant messaging open platform 602, e.g., through its API.

In some implementations, when being started, the third-party application 601 is configured to register on the instant messaging open platform 602 through an appid and an SDK component obtained through preliminary application.

In some implementations, the instant messaging open platform 602 is configured to provide an open API interface for the registered third-party application 601, and perform information transmission with the third-party application 601 through the open API interface.

In some implementations, to implement information transmission between the third-party application 601 and the instant messaging open platform 602, the third-party application 601 may need to access the instant messaging open platform 602.

In some implementations, the third-party application 601 may need to apply from the instant messaging open platform 602 to obtain the appid of the third-party application 601 and download the corresponding SDK component. The preliminary application process may be that the third-party application 601 applies from the instant messaging open platform 602 to obtain the appid and the SDK component in advance after the third-party application is developed and programmed, and the preliminary application process may further be that the third-party application 601 applies from the instant messaging open platform 602 to temporarily obtain the appid and the SDK component when the third-party application 601 may need to access and communicate with the instant messaging open platform 602.

In some implementations, the program of the third-party application 601 is installed on an instant messaging terminal implemented with the instant messaging open platform 602, e.g., a cell phone.

In some implementations, when a user downloads and installs the program of the third-party application on the instant messaging terminal, the third-party application 601 starts the SDK component previously obtained through application, and registers the appid of the third-party application 601 obtained through application and a logo icon of the third-party application 601 on a preset memory area of the instant messaging open platform 602. The preset memory area functions as a special clipboard set by the instant messaging open platform 602, and is used for storing the appid and the logo icon of the third-party application 601, and further for caching information content to be subsequently sent by the third-party application 601 to the instant messaging open platform 602.

In some implementations, to facilitate identification, a special identifier may be established for the preset memory area, and the instant messaging open platform 602 obtains contents in the preset memory area through the special identifier.

In some implementations, when the third-party application 601 finishes registering on the instant messaging open platform 602, the instant messaging open platform 602 provides an open API interface for the registered third-party application 601, and the instant messaging open platform 602 performs information transmission with the third-party application 601 through the open API interface, and sends transmitted information to a user group associated with the instant messaging terminal. In some implementations, information communication between the third-party application 601 and a WeChat user group may be implemented so that media contents transmitted on the instant messaging terminal have more sources and diversities, and become more attractive to the user group.

In some implementations, when the third-party application 601 needs to perform information communication with the instant messaging open platform 602, the third-party application 601 is further configured to cache information contents to be sent in a preset memory area of the instant messaging open platform 602, and start the instant messaging open platform 602 through the SDK component.

In some implementations, the instant messaging open platform 602 is further configured to read the contents in the preset memory area, determine whether a new third-party application 601 exists. If yes, the instant messaging open platform 602 saves the appid and the logo icon of the third-party application 601; and further determines whether information contents to be displayed of the corresponding third-party application 601 exist in the preset memory area, and if yes, transmits the contents to be displayed to a user group associated with a local terminal.

In some implementations, a process in which the third-party application 601 transmits information to the instant messaging open platform 602 is implemented. Through the above solution, more third-party applications 601 may be added to the instant messaging open platform 602 so that media contents transmitted on the instant messaging terminal have more sources and diversities, and become more attractive to the user group, thereby gathering more user groups.

In some implementations, when the instant messaging open platform 602 requests the third-party application 601 to send information content, the instant messaging open platform 602 is further configured to send a request to the third-party application 601 to obtain response information, obtain content of the response information from the preset memory area through checking the preset memory area, and send the content of the response information to a user group associated with the local terminal.

In some implementations, the third-party application 601 is further configured to cache the content of the response information in a preset memory area of the instant messaging open platform 602 according to the request sent by the third-party application 601.

In some implementations, the third-party application 601 may transmit information to the instant messaging open platform 602, and the instant messaging open platform 602 may further request, according to a demand, the third-party application 601 to send corresponding information content.

It is taken as an example in this implementation that the third-party application 601 is Meilishuo and the instant messaging open platform 602 is a WeChat open platform, and a specific example implementing a process in which the third-party application 601 accesses the WeChat open platform and communicates with the WeChat open platform can be obtained with reference to the above method implementation, which is not described herein again.

Figure 7:
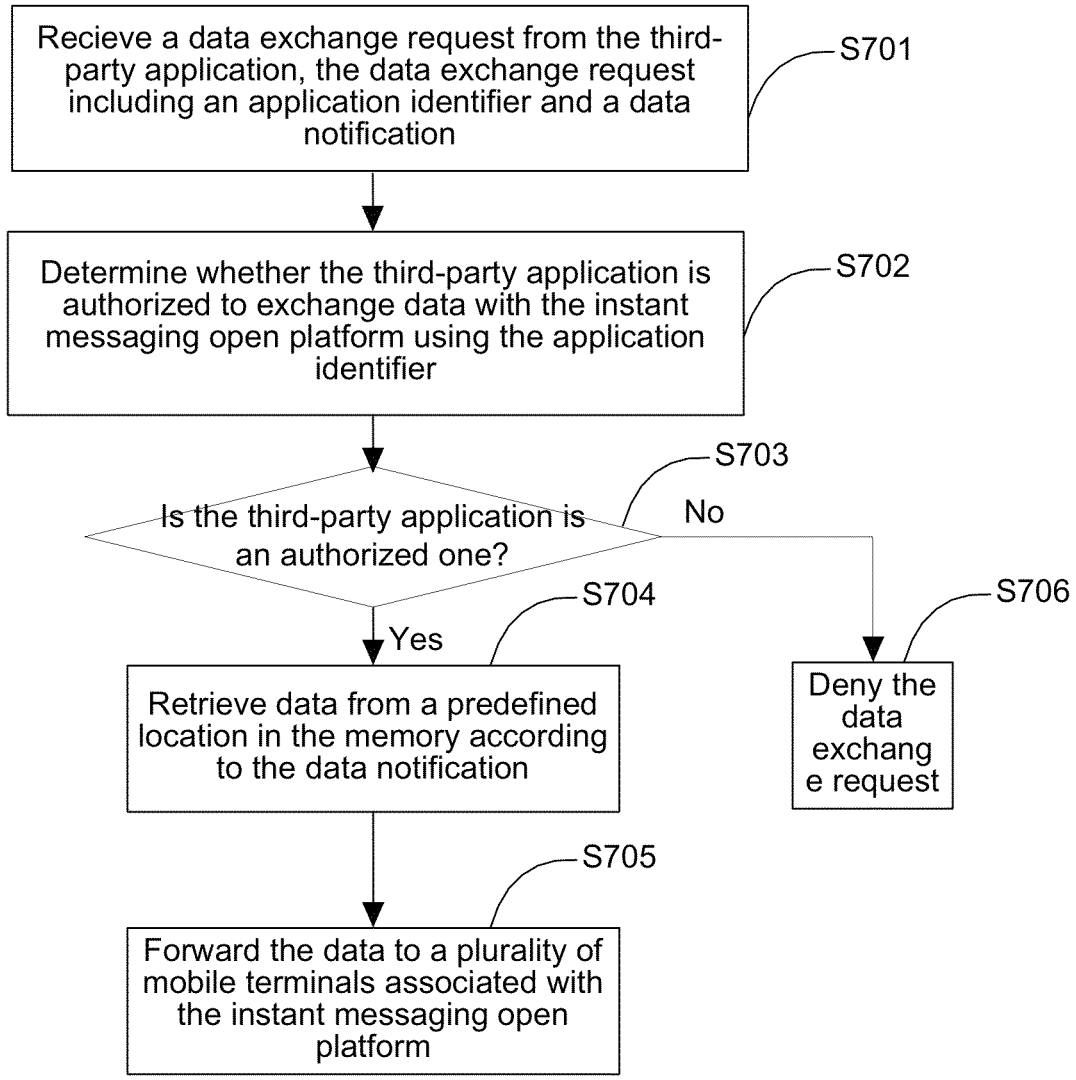
FIG. 7 is an exemplary flow chart of a data exchange method between an instant messaging open platform and a third-party application in accordance with some implementations of the present application.

FIG. 7 is an exemplary flow chart of performing a data exchange method between an instant messaging open platform and a third-party application on a mobile terminal in accordance with some implementations of the present application. The data exchange method between the instant messaging open platform and the a third-party application includes step S701 of receiving a data exchange request from the third-party application, the data exchange request including an application identifier and a data notification; S702 of determining whether the third-party application is authorized to exchange data with the instant messaging open platform using the application identifier; if the third-party application is authorized to exchange data with the instant messaging open platform (S703—yes), S704 of retrieving data from a predefined location in the memory according to the data notification and S705 of forwarding the data to a plurality of mobile terminals associated with the instant messaging open platform; and if the third-party application is not authorized to exchange data with the instant messaging open platform (S703—no), S706 of denying the data exchange request.

Figure 8A:
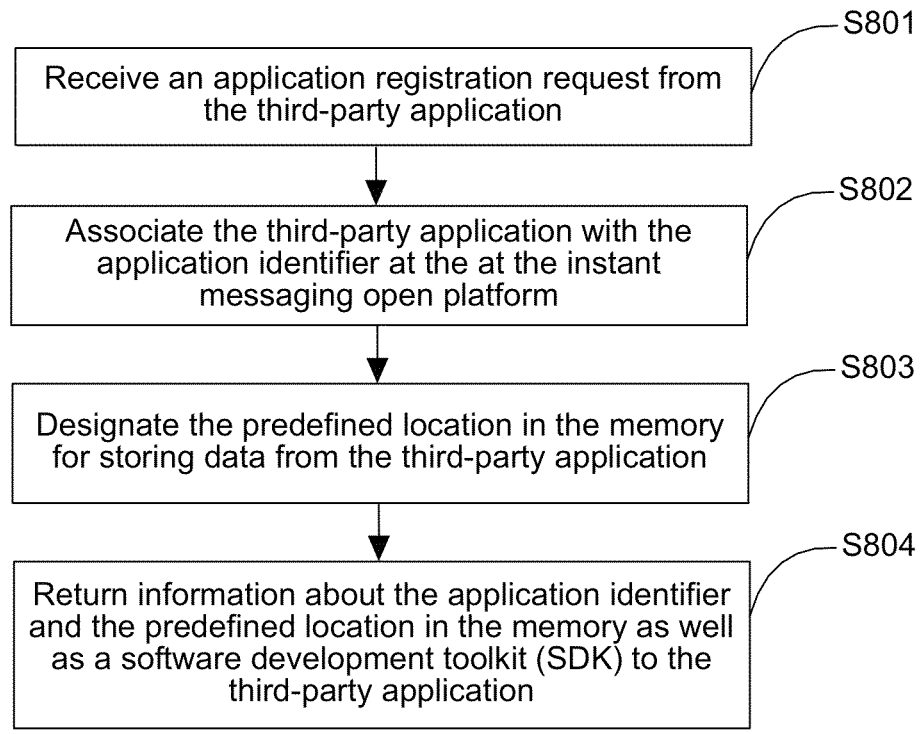
FIG. 8A and FIG. 8B are additional flow charts of the data exchange method between the instant messaging open platform and the third-party application in accordance with some implementations of the present application.
Figure 8B:
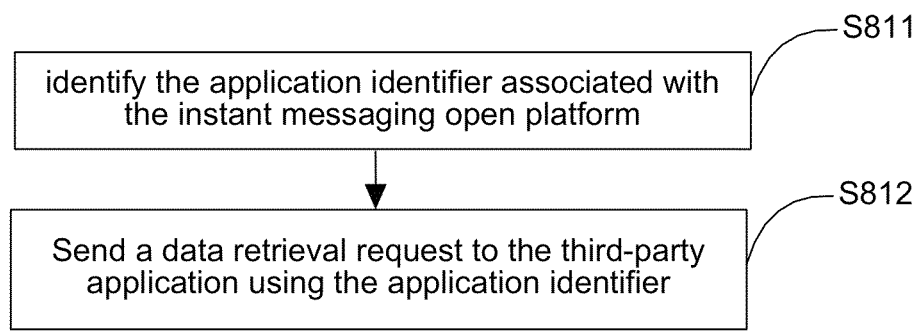

FIG. 8A and FIG. 8B are additional flow charts of performing the data exchange method between the instant messaging open platform and the third-party application on the mobile terminal in accordance with some implementations of the present application. As shown in FIG. 8A, the data exchange method further includes: before receiving the data exchange request, S801 of receiving an application registration request from the third-party application; S802 of associating the third-party application with the application identifier at the at the instant messaging open platform; S803 of designating the predefined location in the memory for storing data from the third-party application; and S804 of returning information about the application identifier and the predefined location in the memory as well as a software development toolkit (SDK) to the third-party application such that the third-party application can exchange data with the instant messaging open platform via an open application program interface (API). In other words, the third-party first registers with the instant messaging open platform before it can transmit data to the platform. For each third-party application, the instant messaging open platform allocates a specific location in the memory of the mobile terminal for receiving the data from the third-party application. In some implementations, the third-party application also runs on the mobile terminal and the third-party application uses the SDK for storing data at the predefined location in the memory and notifying the instant messaging open platform of the data in the memory. For example, the third-party application invokes the SDK to initiate the data exchange request with the instant messaging open platform. The third-party application may also include an application icon in the application registration request. In some implementations, as described above, the instant messaging open platform is associated with a user of the mobile terminal that is a member of a group of users, each other user in the group being associated with a respective one of the plurality of mobile terminals for receiving the data provided by the third-party application. For example, the user of the mobile terminal has a group of friends that the user would like to share information from the third-party application. In this case, the mobile terminal the identity information of the mobile terminals used by the group of friends such that the instant messaging open platform may distribute the information from the third-party application to the mobile terminals used by the friends with or without an express user instruction to the instant messaging open platform.

Note that the process disclosed in FIG. 8A indicates that the third-party application actively initiates the data exchange with the instant messaging open platform. In some other implementations (as shown in FIG. 8B), it is the instant messaging open platform that actively initiates the data exchange with the third-party application, which plays a more passive role. The method performed by the instant messaging open platform includes: before receiving the data exchange request: S811 of identifying the application identifier associated with the instant messaging open platform; and S812 of sending a data retrieval request to the third-party application using the application identifier. In response to the data retrieval request, the third-party application stores the data at the predefined location in the memory and then sends the data exchange request to the instant messaging open platform.

Figure 9A:
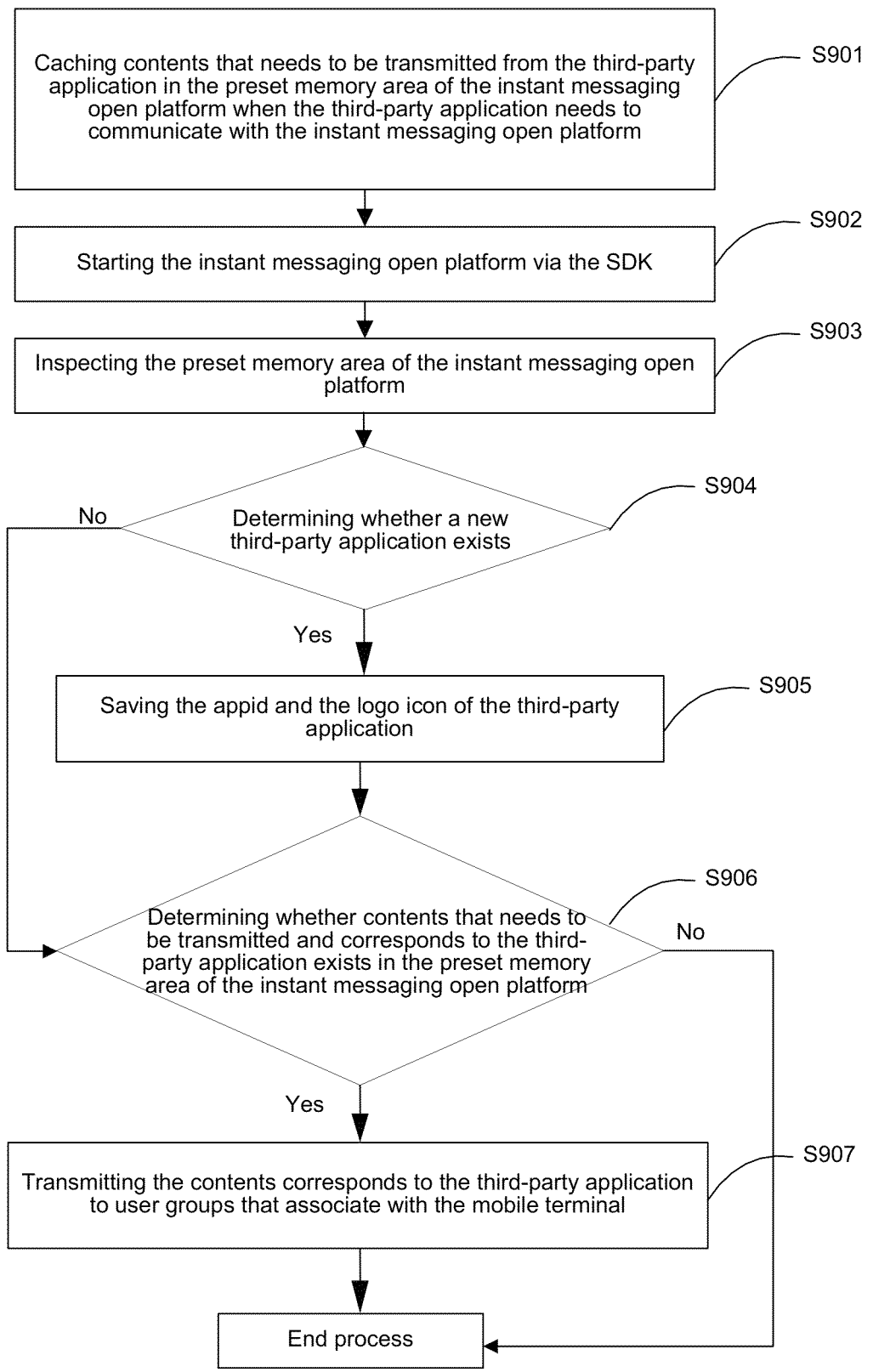
FIG. 9A is an exemplary flow chart of a method of instant messaging for a third-party application by implementing information exchange between the third-party application and the instant messaging open platform in accordance with some implementations of the present application.

FIG. 9A is an exemplary flow chart of a method of instant messaging for a third-party application by implementing information exchange between the third-party application and the instant messaging open platform in accordance with some implementations of the present application. The step S704 of transmitting information between the instant messaging open platform and the third-party application via the open API, as illustrated in FIG. 7, further includes step S901 of caching contents that may need to be transmitted from the third-party application in the preset memory area of the instant messaging open platform when the third-party application may need to communicate with the instant messaging open platform; step S902 of starting the instant messaging open platform via the SDK; and step S903 of inspecting the preset memory area of the instant messaging open platform, and step S904 of determining whether a new third-party application exists, if the new third-party application exists, step 905 of saving the appid and the logo icon of the third-party application, and step 906 of determining whether contents that may need to be transmitted and corresponds to the third-party application exists in the preset memory area of the instant messaging open platform, if contents that may need to be transmitted and corresponds to the third-party application exists, step 907 of transmitting the contents corresponds to the third-party application to user groups that associate with the mobile terminal.

Figure 9B:
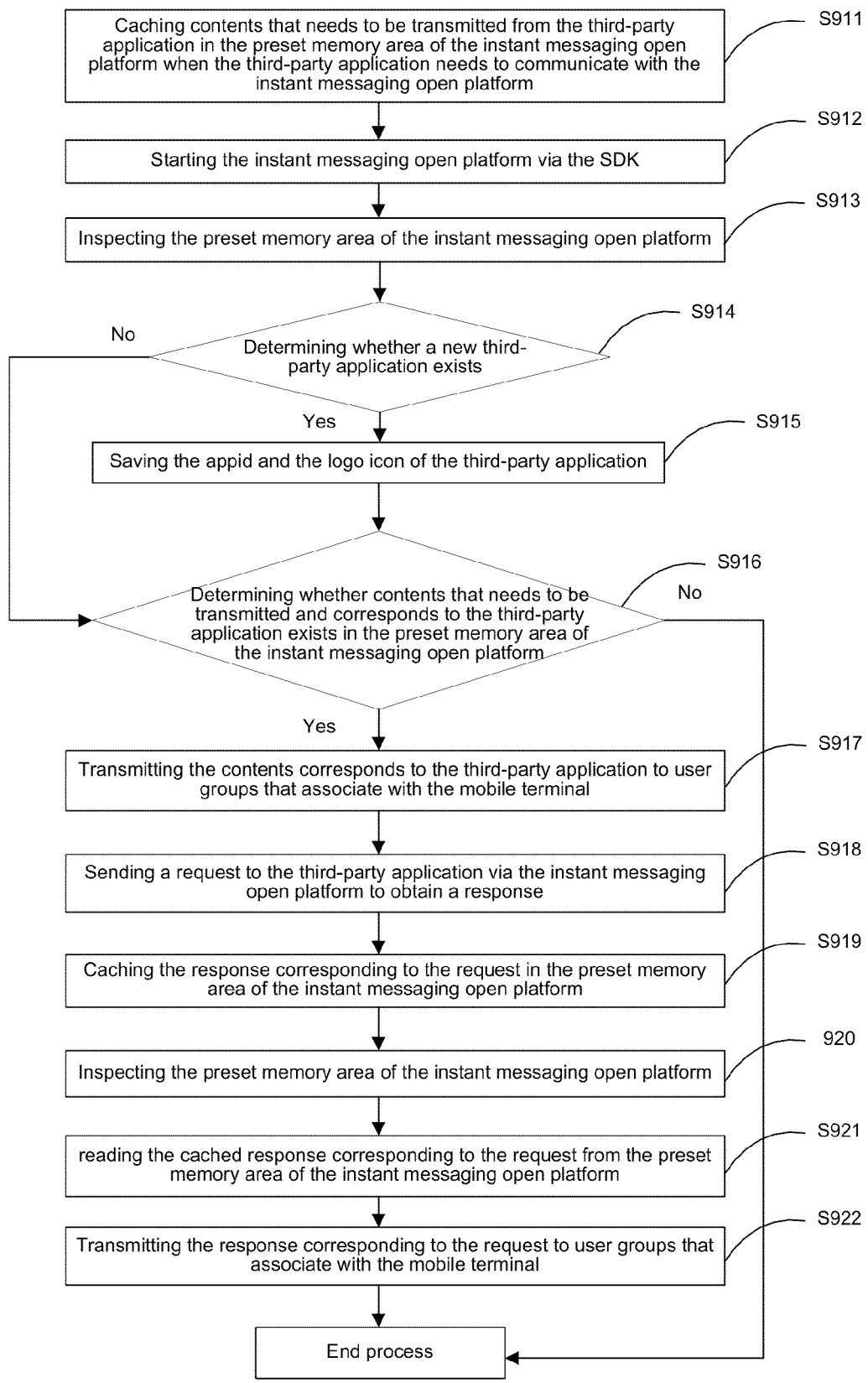
FIG. 9B is another exemplary flow chart of a method of instant messaging for a third-party application by implementing information exchange between the third-party application and the instant messaging open platform in accordance with some implementations of the present application.

FIG. 9B is another exemplary flow chart of a method of instant messaging for a third-party application by implementing information exchange between the third-party application and the instant messaging open platform in accordance with some implementations of the present application. The step of transmitting information between the instant messaging open platform and the third-party application via the open API may further include step S918 of sending a request to the third-party application via the instant messaging open platform to obtain a response; S919 of caching the response corresponding to the request in the preset memory area of the instant messaging open platform; S920 of inspecting the preset memory area of the instant messaging open platform; S921 of reading the cached response corresponding to the request from the preset memory area of the instant messaging open platform; and S922 of transmitting the response corresponding to the request to user groups that associate with the mobile terminal.

Figure 10:
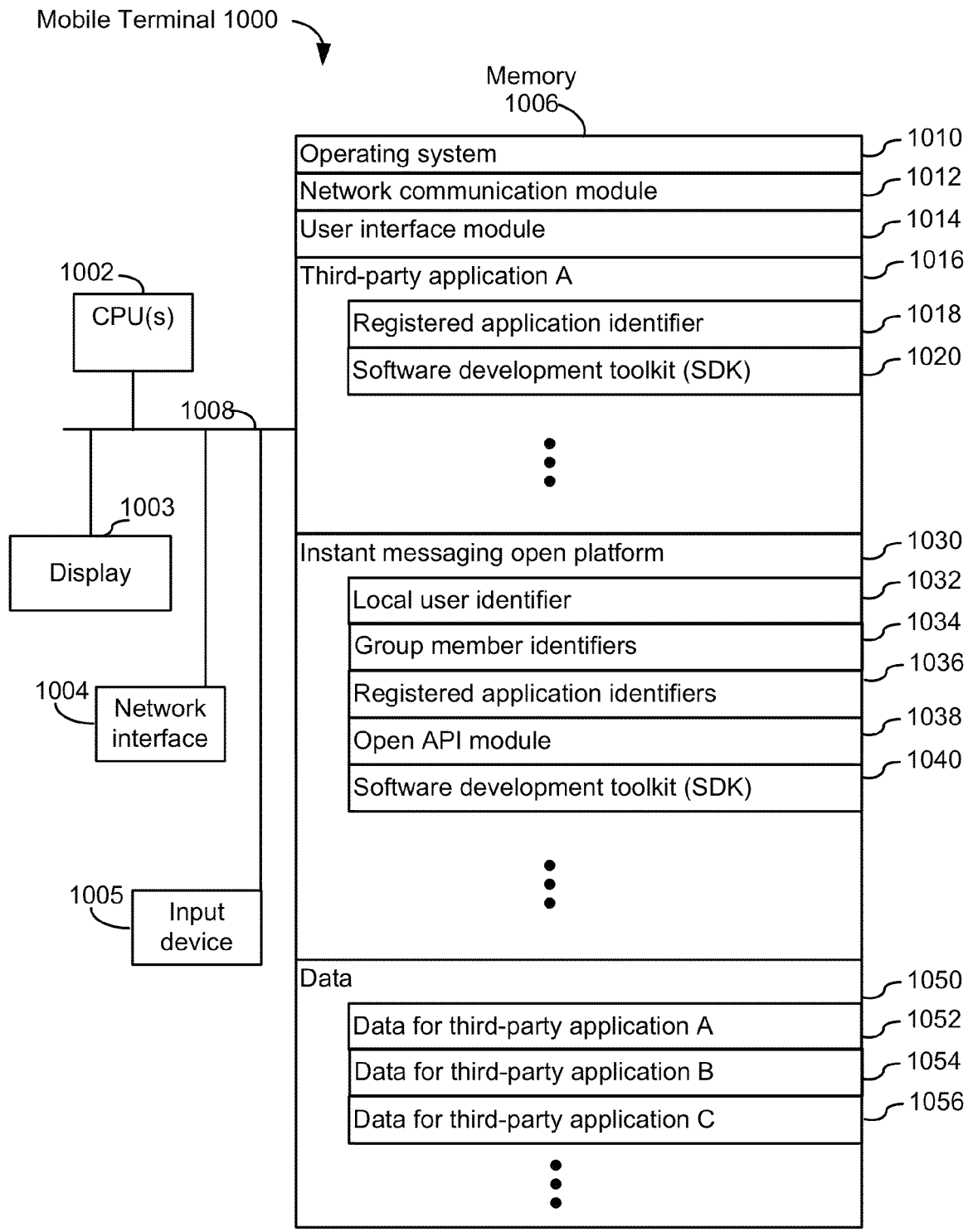
FIG. 10 is a block diagram illustrating an exemplary mobile terminal implementing the data exchange method in accordance with some implementations of the present application.

FIG. 10 is a block diagram illustrating an exemplary mobile terminal 1000 implementing the data exchange method in accordance with some implementations of the present application. The mobile terminal 1000 includes one or more processing units CPU(s) 1002 (also herein referred to as processors), one or more network interfaces 1004, one or more input devices 1005, a display 1003, memory 1006, and one or more communication buses 1008 for interconnecting these components. In some implementations, the one or more user input devices 1005 include a keyboard, a mouse, a trackpad, and a touchscreen. The communication buses 1008 optionally include circuitry (sometimes called a chipset) that interconnects and controls communications between system components.

The memory 1006 typically includes high-speed random access memory, such as DRAM, SRAM, or other random access solid state memory devices; and optionally includes non-volatile memory, such as one or more magnetic disk storage devices, optical disk storage devices, flash memory devices, or other non-volatile solid state storage devices. The memory 1006 optionally includes one or more storage devices remotely located from the CPU(s) 1002. The memory 1006 or alternatively the non-volatile memory device(s) within the memory 1006, comprises a non-transitory computer readable storage medium. In some implementations, the memory 1006 or alternatively the non-transitory computer readable storage medium stores the following programs, modules and data structures, or a subset thereof:

an operating system 1010, which includes procedures for handling various basic system services and for performing hardware dependent tasks;

a network communication module (or instructions) 1012 for connecting the mobile terminal 1000 with other devices (e.g., a remote server or client device) via one or more network interfaces 1004 (wired or wireless) and a communication network (e.g., the Internet);

a user interface module 1014 for displaying different user interface controls (e.g., textboxes or dropdown lists or push buttons) as well as data (e.g., the information generated by a third-party application 1016 or an instant messaging open platform 1030) in accordance with user input;

a third-party application 1016 that further includes:
- a registered application identifier 1018 (if the third-party application has registered with the instant messaging open platform 1030; and
- a software development toolkit 1020 associated with the instant messaging open platform 1030;

an instant messaging open platform 1030 that further includes:
- a local user identifier 1032 for identifying a user of the instant messaging open platform, who is often the user of the mobile terminal 1000;
- a group of member identifiers 1034 for identifying a group of users that communicate with the user of the instant messaging open platform;
- one or more registered application identifiers 1036 for identifying third-party applications that have registered with the instant messaging open platform 1030;
- an open API module 1038 supporting the data exchange between the instant messaging open platform 1030 and the third-party applications; and
- a software development toolkit 1040 associated with the instant messaging open platform 1030 and to be downloaded to the third-party applications;

data 1050 stored in the memory 1006, which include data (1052-1056) associated with different third-party applications, each occupying a predefined region in the memory 1006.

In the instant messaging method and system oriented to third-party applications of the present invention, the third-party application and the instant messaging open platform may transmit information to each other through the open API interface of the instant messaging open platform (for example, the WeChat). The third-party application may actively or passively provide media content to the instant messaging open platform, and an instant messaging terminal implemented with the instant messaging open platform displays the media contents in a friend dialog box or sends the media contents to a circle of friends, and therefore, more third-party applications may be added to the instant messaging open platform so that media contents transmitted on instant messaging terminals, e.g., the WeChat, have more sources and diversities, and become more attractive to the user group.

The foregoing descriptions are merely exemplary implementations of the present invention, but are not intended to limit a scope of the present invention. Any equivalent structural or process replacement made by using content of the specification and accompanying drawings of the present invention, or direct or indirect application to other relevant technical fields should all likewise fall within the protection scope of the present invention.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will further be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A data exchange method between an instant messaging open platform and a third-party application, the method comprising:
at the instant messaging open platform running on a mobile terminal having memory and one or more processors:
reading identifier data from a predefined location in the memory;
determining whether the identifier data read from the predefined location in memory includes an application identifier and a logo icon of a newly registered third-party application;
in accordance with a determination that the identifier data read from the predefined location in memory includes a respective application identifier and a respective icon of a first third-party application that is a newly registered third-party application, adding the first third-party application to a user interface of the instant messaging open platform;
receiving a data exchange request from the first third-party application, the data exchange request including the respective application identifier of the first third-party application and a data notification;
determining whether the first third-party application is authorized to exchange data with the instant messaging open platform using the respective application identifier;
if the first third-party application is authorized to exchange data with the instant messaging open platform:
retrieving content data from the predefined location in the memory according to the data notification; and
forwarding the content data to a plurality of mobile terminals associated with the instant messaging open platform; and
if the first third-party application is not authorized to exchange data with the instant messaging open platform, denying the data exchange request.

2. The method of claim 1, further comprising:
before receiving the data exchange request:
receiving an application registration request from the first third-party application;
associating the first third-party application with the respective application identifier of the first third-party application at the at the instant messaging open platform;
designating the predefined location in the memory for storing data from the first third-party application; and
returning information about the respective application identifier of the first third-party application and the predefined location in the memory as well as a software development toolkit (SDK) to the first third-party application such that the first third-party application can exchange data with the instant messaging open platform via an open application program interface (API).

3. The method of claim 2, wherein the first third-party application also runs on the mobile terminal and the first third-party application uses the SDK for storing data at the predefined location in the memory and notifying the instant messaging open platform of the data in the memory.

4. The method of claim 2, wherein the first third-party application invokes the SDK to initiate the data exchange request with the instant messaging open platform.

5. The method of claim 2, wherein the first third-party application includes the respective application icon of the first third-party application in the application registration request.

6. The method of claim 2, wherein the instant messaging open platform is associated with a user of the mobile terminal that is a member of a group of users, each other user in the group being associated with a respective one of the plurality of mobile terminals for receiving the data provided by the first third-party application.

7. The method of claim 1, further comprising:
before receiving the data exchange request:
identifying the respective application identifier associated with first third-party application; and
sending a data retrieval request to the first third-party application using the respective application identifier of the first third-party application,
wherein, in response to the data retrieval request, the first third-party application stores the data at the predefined location in the memory and then sends the data exchange request to the instant messaging open platform.

8. A mobile terminal for supporting data exchange between an instant messaging open platform and a third-party application, the mobile terminal comprising:
one or more processors; and
memory for storing one or more programs, wherein the one or more programs, when executed by the one or more processors, cause the instant messaging open platform to perform the following instructions:
reading identifier data from a predefined location in the memory;
determining whether the identifier data read from the predefined location in memory includes an application identifier and a logo icon of a newly registered third-party application;
in accordance with a determination that the identifier data read from the predefined location in memory includes a respective application identifier and a respective icon of a first third-party application that is a newly registered third-party application, adding the first third-party application to a user interface of the instant messaging open platform;
receiving a data exchange request from the first third-party application, the data exchange request including the respective application identifier of the first third-party application and a data notification;
determining whether the first third-party application is authorized to exchange data with the instant messaging open platform using the respective application identifier;
if the first third-party application is authorized to exchange data with the instant messaging open platform:
retrieving content data from the predefined location in the memory according to the data notification; and
forwarding the content data to a plurality of mobile terminals associated with the instant messaging open platform; and
if the first third-party application is not authorized to exchange data with the instant messaging open platform, denying the data exchange request.

9. The mobile terminal of claim 8, wherein the one or more programs further include instructions for:
before receiving the data exchange request:
receiving an application registration request from the first third-party application;
associating the first third-party application with the respective application identifier of the first third-party application at the at the instant messaging open platform;

designating the predefined location in the memory for storing data from the first third-party application; and returning information about the respective application identifier of the first third-party application and the predefined location in the memory as well as a software development toolkit (SDK) to the first third-party application such that the first third-party application can exchange data with the instant messaging open platform via an open application program interface (API).

10. The mobile terminal of claim 9, wherein the first third-party application also runs on the mobile terminal and the first third-party application uses the SDK for storing data at the predefined location in the memory and notifying the instant messaging open platform of the data in the memory.

11. The mobile terminal of claim 9, wherein the first third-party application invokes the SDK to initiate the data exchange request with the instant messaging open platform.

12. The mobile terminal of claim 9, wherein the first third-party application includes the respective application icon of the first third-party application in the application registration request.

13. The mobile terminal of claim 9, wherein the instant messaging open platform is associated with a user of the mobile terminal that is a member of a group of users, each other user in the group being associated with a respective one of the plurality of mobile terminals for receiving the data provided by the first third-party application.

14. The mobile terminal of claim 8, wherein the one or more programs further include instructions for:
   before receiving the data exchange request:
      identifying the respective application identifier associated with first third-party application; and
      sending a data retrieval request to the first third-party application using the respective application identifier of the first third-party application,
   wherein, in response to the data retrieval request, the first third-party application stores the data at the predefined location in the memory and then sends the data exchange request to the instant messaging open platform.

15. A non-transitory computer readable storage medium in conjunction with a mobile terminal for storing an instant messaging open platform and a third-party application and supporting data exchange method between the instant messaging open platform and the third-party application, the instant messaging open platform including one or more instructions for:
   one or more processors; and
   memory for storing one or more programs, wherein the one or more programs, when executed by the one or more processors, cause the instant messaging open platform to perform the following instructions:
      reading identifier data from a predefined location in the memory;
      determining whether the identifier data read from the predefined location in memory includes an application identifier and a logo icon of a newly registered third-party application;
      in accordance with a determination that the identifier data read from the predefined location in memory includes a respective application identifier and a respective icon of a first third-party application that is a newly registered third-party application, adding the first third-party application to a user interface of the instant messaging open platform;
      receiving a data exchange request from the first third-party application, the data exchange request including the respective application identifier of the first third-party application and a data notification;
      determining whether the first third-party application is authorized to exchange data with the instant messaging open platform using the respective application identifier;
      if the first third-party application is authorized to exchange data with the instant messaging open platform:
         retrieving content data from the predefined location in the memory according to the data notification; and
         forwarding the content data to a plurality of mobile terminals associated with the instant messaging open platform; and
      if the first third-party application is not authorized to exchange data with the instant messaging open platform, denying the data exchange request.

16. The non-transitory computer readable storage medium of claim 15, wherein the instant messaging open platform further includes instructions for:
   before receiving the data exchange request:
      receiving an application registration request from the first third-party application;
      associating the first third-party application with the respective application identifier of the first third-party application at the at the instant messaging open platform;
      designating the predefined location in the memory for storing data from the first third-party application; and
      returning information about the respective application identifier of the first third-party application and the predefined location in the memory as well as a software development toolkit (SDK) to the first third-party application such that the first third-party application can exchange data with the instant messaging open platform via an open application program interface (API).

17. The non-transitory computer readable storage medium of claim 16, wherein the first third-party application also runs on the mobile terminal and the first third-party application uses the SDK for storing data at the predefined location in the memory and notifying the instant messaging open platform of the data in the memory.

18. The non-transitory computer readable storage medium of claim 16, wherein the first third-party application invokes the SDK to initiate the data exchange request with the instant messaging open platform.

19. The non-transitory computer readable storage medium of claim 16, wherein the first third-party application includes the respective application icon of the first third-party application in the application registration request.

20. The non-transitory computer readable storage medium of claim 16, wherein the instant messaging open platform is associated with a user of the mobile terminal that is a member of a group of users, each other user in the group being associated with a respective one of the plurality of mobile terminals for receiving the data provided by the first third-party application.

* * * * *